United States Patent [19]
Musacchia

[11] Patent Number: 5,273,380
[45] Date of Patent: Dec. 28, 1993

[54] DRILL BIT POINT

[76] Inventor: James E. Musacchia, 110 Cliffwood Ct., Greer, S.C. 29650

[21] Appl. No.: 922,859

[22] Filed: Jul. 31, 1992

[51] Int. Cl.⁵ .............................................. B23B 51/02
[52] U.S. Cl. ..................................... 408/230; 51/288; 76/108.6; 408/227
[58] Field of Search ............... 51/219 R, 281 SF, 288; 76/5.1, 108.6; 408/230, 715, 227–229

[56] References Cited

U.S. PATENT DOCUMENTS

| | | | |
|---|---|---|---|
| 1,747,117 | 2/1930 | Klein | 76/108.6 |
| 2,371,676 | 3/1945 | Coyne | 51/219 R |
| 4,116,580 | 9/1978 | Hall et al. | 408/230 |
| 4,222,690 | 9/1980 | Hosoi | 408/230 |
| 4,483,104 | 11/1984 | Welliver | 51/219 R |
| 4,583,888 | 4/1986 | Mori et al. | 408/230 X |
| 4,645,389 | 2/1987 | Maier | 408/230 |

OTHER PUBLICATIONS

Advertisement—Mohawk Cutting Tools, pp. 77, 123, and 133.
Advertisement—Showa Tool USA, Inc., Price List and Types of Drills.
Advertisement—Showa Tool USA, Inc., Neomet Insert Regrinding Instructions.
Advertisement—Showa Tool USA, Inc., Neomet Insert Drills.

Primary Examiner—Steven C. Bishop
Attorney, Agent, or Firm—Dority & Manning

[57] ABSTRACT

A drill bit is provided having a novel drill point for drilling a variety of materials. The drill point comprises at least two opposed cutting edges, the cutting edges forming a predetermined drill point angle. The cutting edges have a first radial component between the extreme tip of the drill point and their respective lands. The first radial component is substantially concave. The cutting edges have a second radial component defined generally where the cutting edge merges with its respective land, the second radial component being substantially convex. The drill point of the invention can be applied to any variety of drill bit or cutting tool having any number of flutes, or may comprise a replaceable drill point. A method is also provided for forming the novel drill point according to the invention.

20 Claims, 6 Drawing Sheets

| DRILL DIA. | A | B | C | D | E | F | R₁ | R₂ |
|---|---|---|---|---|---|---|---|---|
| .236 | .053 | .040 | .005 | .020 | .015 | .010 | .020 | .080 |
| .350 | .080 | .060 | .015 | .020 | .040 | .035 | .020 | .100 |
| .400 | .090 | .065 | .020 | .025 | .045 | .035 | .025 | .100 |
| .450 | .115 | .060 | .025 | .030 | .053 | .040 | .030 | .175 |
| .541 | .115 | .070 | .050 | .035 | .050 | .043 | .035 | .200 |
| .590 | .140 | .070 | .050 | .035 | .065 | .043 | .035 | .200 |
| .625 | .155 | .073 | .050 | .035 | .070 | .050 | .035 | .200 |
| .750 | .135 | .090 | .110 | .040 | .080 | .060 | .040 | .300 |
| .812 | .150 | .090 | .125 | .040 | .090 | .075 | .040 | .350 |
| .875 | .148 | .090 | .150 | .050 | .100 | .080 | .050 | .350 |
| .937 | .150 | .095 | .175 | .050 | .110 | .090 | .050 | .400 |
| 1.00 | .155 | .095 | .200 | .050 | .120 | .105 | .050 | .400 |

DRILL BIT POINT

BACKGROUND OF THE INVENTION

The present invention relates to an improved point for cutting tools, and more particularly to a drill bit with a unique point surface adapted for extended wear.

Most drill points are machine point ground and a variety of drill point styles are known and particularly adapted for specific drilling tasks. For example, the 118° general purpose drill bit is the most commonly used drill point and gives satisfactory results in a wide variety of materials. The Racon is another known style point and forms a relatively large arc with its curved lips and has a rounded lip corner reducing corner wear and eliminating burrs at exit. Split point drill points are known in the art for being self-centering and requiring less torque and thrust in hand or machine drilling. The Double Angle point is used in drilling of abrasive materials. The double angle on this point acts as a chamber concentrating tool wear along the entire cutting lip and reducing corner wear. A helical drill point has a "S" shaped chisel making the point self-centering and requiring less torque and thrust. Insert drill bits are also known in the art wherein insert tips of varying sizes and profiles are interchangeable with the body of a drill bit.

Regardless of the shape of the chisel or lip curvature, the life of the drill point depends on how well the point dissipates heat. If the point does not adequately conduct heat away from its cutting edges, the temperature buildup will "burn" the point and diminish the life of the drill bit. The heat generated at the lip of the drill point is directly related to the load and stresses the lip is subjected to. The more efficiently load stresses are dissipated, the less heat is built up at the cutting edge of the drill point. The Racon point mentioned above attempts to minimize stress by curving the cutting lip. Although this point does offer an improvement, heat dissipation and wear are still critical concerns in the art.

Applicant's present invention offers a significant improvement in the art, providing a unique drill point having distinct wear advantages over conventional drill points.

OBJECTS AND SUMMARY OF THE INVENTION

It is an object of the invention to provide a drill point and method for making same which has an extended life and enhanced wear characteristics.

Yet a further object of the present invention is to provide a unique drill point profile having enhanced wear characteristics which can be incorporated with conventional drill point styles.

Still a further object of the present invention is to provide a reamer having an increased life over conventional reamers.

An yet another object of the present invention is to provide a step drill bit having an improved wearing drill point.

And still another object of the present invention is to provide a step drill-reamer bit having an improved wearing drill point.

Another object of the present invention is to provide a drill point that does not drift or wander during a drilling operation.

Still another object of the present invention is to provide a drill tip insert having an enhanced wear cutting edge profile.

It is also an object of this invention to provide a method for forming an enhanced wearing drilling point onto a cutting tool, including forming the point onto existing cutting tools.

Additional objects and advantages of the invention will be set forth in part in the description which follows, and in part will be obvious from the description, may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a drill point for use on any variety of drill bits is provided. The drill point comprises at least two opposed cutting edges, the cutting edges forming a predetermined drill point angle. For example, a nominal drill bit has a drill point angle of 118°. The cutting edges further comprise a first radial component between the extreme tip of the drill point and a land of the drill point, the first radial component being substantially concave with respect to a plane drawn perpendicular to the longitudinal axis of the drill point. Further, the cutting edges include a second radial component defined generally where the cutting edge merges with its respective land, the second radial component being substantially convex with respect to a plane drawn perpendicular to the longitudinal axis of the drill point.

Preferably, the cutting edges also comprise a substantially flat component at the tip thereof with the first radial component merging from the flat component and the second radial component merging from the first radial component and forming the corner for the cutting edge and its respective land. In a preferred embodiment, the first and second radial components are defined in the primary relief of the cutting edges. The primary relief may merge into a secondary relief which is substantially flat.

The drill point according to the present invention may comprise any manner of drill point, such as an insert drill point. Also, the drill point may include at least one coolant channel hole defined in a relief surface thereof. Preferably, the drill point according to the invention may also comprise a chip breaking chisel edge at the extreme tip of the drill point, the chisel edge being defined by a ground out portion of the webs of each of the cutting edges.

In further accordance with the purpose of the present invention, a drill bit for drilling a variety of materials is provided. The drill bit includes a plurality of lands, the lands defining respective flutes. At least two cutting edges are defined by at least two lands, the cutting edges having a substantially flat component, with the opposed cutting edges forming into a predetermined drill point angle. The cutting edges have a first substantially concave radial component between the flat component and the respective land for that cutting edge. The drill bit further includes a corner where the cutting edge merges with its respective land, the corner having a substantially convex radial component.

The drill bit according to the present invention may comprise any variety of drill bits, for example, a two-fluted, four-fluted, or five-fluted drill bit. Also, the drill bit according to the invention may be formed as a step drill bit or reamer drill bit.

In further accordance with the objects of this invention, a cutting tool is provided for cutting into a variety of materials such as wood, ceramic, metal, rock, bone, etc. The cutting tool includes a body section and at least two opposed cutting edges extending from the extreme end of the body section, the cutting edges forming a cutting point having a predetermined point angle. The cutting edges further comprise oppositely disposed adjacent radial components. A first substantially concave radial component is defined between the body and the cutting point and a second substantially convex radial component is defined where the cutting edge merges with the body.

In further accordance with the purpose of the present invention, a method is provided for forming a drill bit having an extended wear drill point. The method comprises the steps of forming a blank into a drill bit having at least two flutes and forming a cutting edge onto the drill bit. The method further includes grinding a first concave radial component into the cutting edge, preferably using generally simultaneous axial and radial grinding strokes of a grinding or forming machine. The method further includes grinding a second convex radial component into the corner of the cutting edge and the land of the drill bit. Preferably, the method of the present invention further includes the step of forming a chip breaking chisel edge into the drill point by grinding out a portion of the drill point web. Also, the method may preferably include the step of forming the drill bit into a reamer drill bit, including grinding an additional lip margin into the drill bit lands.

And in further accordance with the present invention, a method is provided for forming an enhanced-wear drill point onto an existing drill bit. This method comprises the step of grinding a first concave radial component into the existing cutting edge of the drill point preferably with substantially simultaneous axial and radial grinding strokes of a grinding machine. The method also includes the step of grinding a second concave radial component from the existing corner of the drill point with a grinding machine.

The accompanying drawings, which are incorporated in and constitute a part of the specification, illustrate one embodiment of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended figures, in which.

Repeat use of reference characters in the following specification and appended drawings is intended to represent the same or analogous features, elements, or steps of the present invention.

DETAILED DESCRIPTION OF THE PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and equivalents.

The present invention pertains in general to an enhanced-wear drill point. Particularly, a unique profile for cutting edges of a drill point is provided which substantially increases the life of the drill point. Although the following description will generally refer to the apparatus and method of the present invention in regards to machine drill bits and points, such is not a limitation of the invention and is only illustrative of one application of the present invention. For example, the drill point according to the invention provides significant benefits in any number of applications requiring a device for drilling through any variety of material. For example, the drill point according to the present invention may be employed on surgical or dental instruments, mining or oil exploration equipment, precision tools, and so forth. It is within the scope and spirit of this invention to include the innovative drill point on any type of tool or cutting device for drilling or cutting into any variety of materials.

Also, the present invention has applications to the wide variety of conventional cutting tools and styles of drill bits. For example, it is within the spirit of this invention to include the novel drill point on multiple diameter cutting tools, core drills, reamer style tools, step tools, and so forth. Essentially, the present invention can be applied to any cutting tool or device utilizing a cutting edge. Additionally, the present invention is not limited to any size tool but may be applied to any conventionally available size of drill bit or cutting tool.

Figure 1:
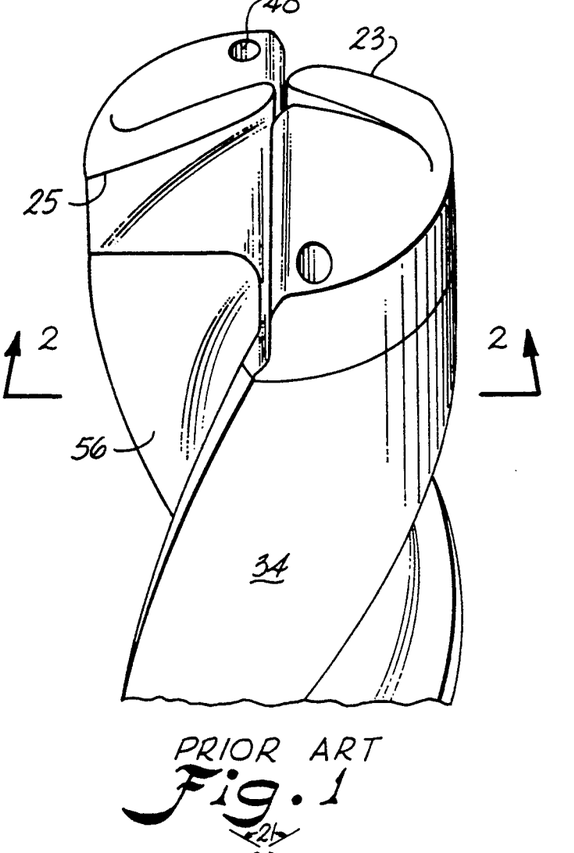
FIG. 1 is a perspective view of a prior art drill bit.
Figure 2:
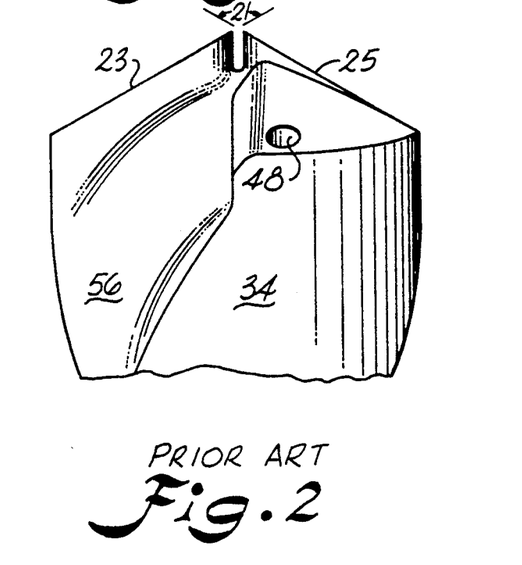
FIG. 2 is a frontal view of the prior art drill bit illustrated in FIG. 1 taken along the lines 2—2 indicated in FIG. 1.

In order to better disclose and illustrate the present invention, embodiments of prior art devices are illustrated in FIGS. 1 through 4. FIGS. 1 and 2 illustrate a conventional drill bit. The point for this drill bit includes cutting edges 23 and 25. These cutting edges are flat and form a predetermined point angle depicted generally as 21. For the most common type of drill bit, point angle 21 is nominally 118°. A coolant channel hole 48 is defined in the relief surface of this drill point and its use is commonly understood by those skilled in the art.

Cutting edges 23 and 25 are flat and have a constant slope from the tip thereof to the respective lands 34 for the drill bit. Due to their straight and flat profiles, cutting edges 23 and 25 generate a relatively high degree of heat when cutting. Again, due to the profile of the cutting edges, the heat is not readily dissipated away from the cutting edges. Eventually, the heat build up becomes destructive to the drill point causing scorching or deformation of the cutting edges and decreasing the life of the drill bit.

Figure 3:
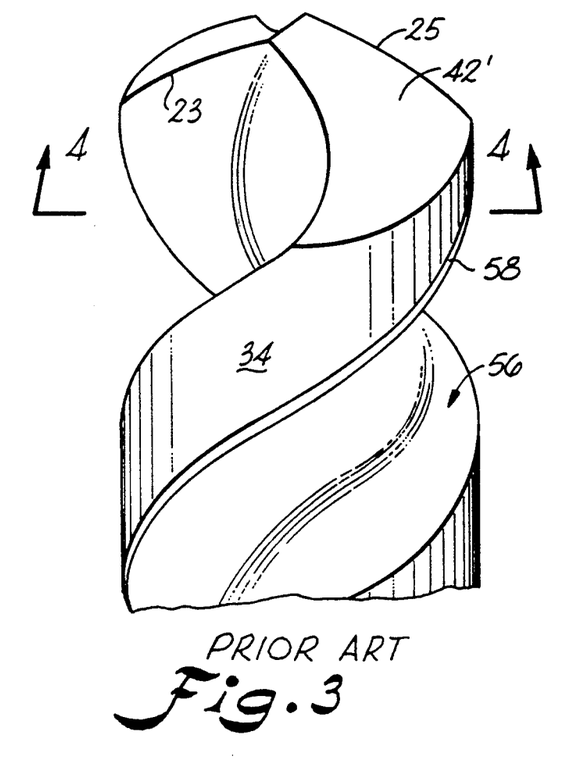
FIG. 3 is a perspective view of a second prior art drill bit.
Figure 4:
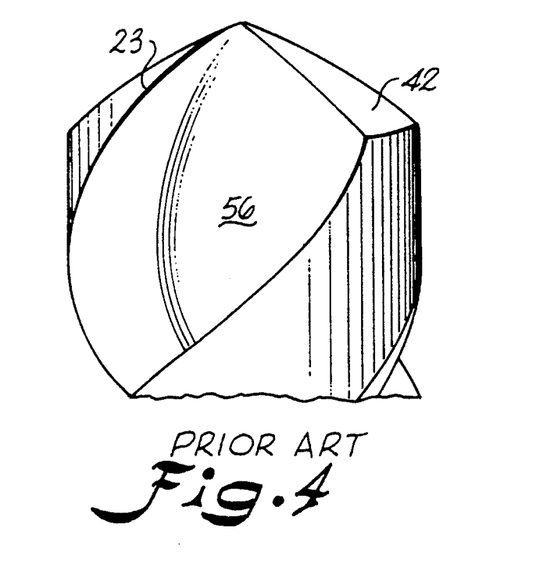
FIG. 4 is a front elevational view of the prior art drill bit shown in FIG. 3 taken along the line of 4—4 indicated in FIG. 3.

FIGS. 3 and 4 illustrate another conventional drill point. With this drill point, cutting edges 23 and 25 are substantially convex from the tip of the drill point to their respective lands 34. The curvature of edges 23 and 25 in this bit tends to tangentially direct generated stress back into the drill point thereby increasing the heat build up in the point. Since the heat generated is not adequately dissipated from the cutting edges, the drill point prematurely wears out.

The present invention provides a novel profile for a cutting edge of a drill point and method for making same which enhances the dissipation of heat and stress tangentially away from the cutting edge, significantly increasing the life of the drill point.

Figures 5, 7:
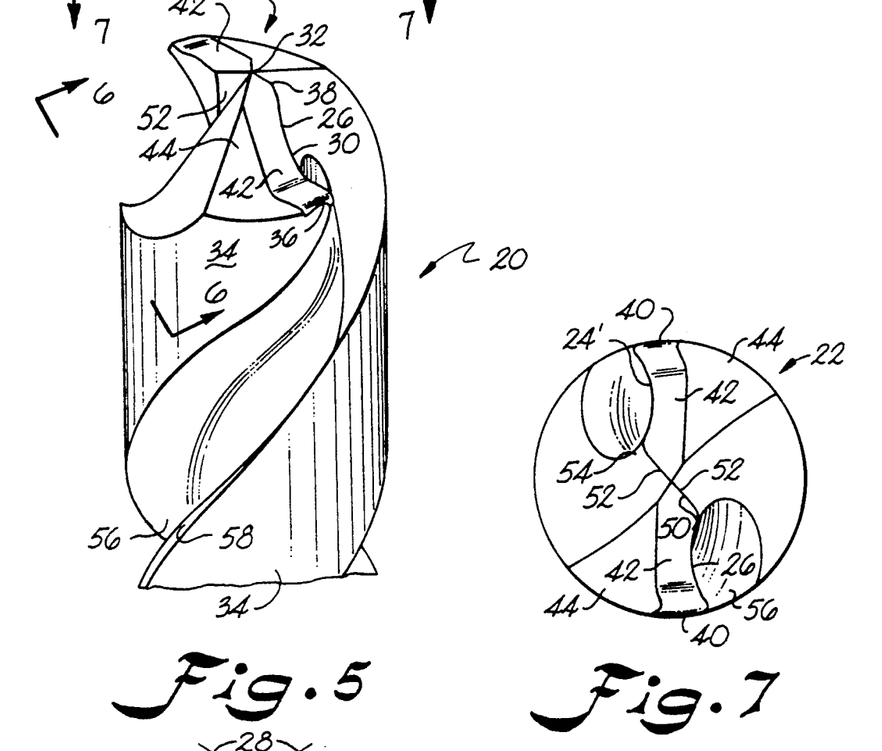
FIG. 5 is a perspective of a two-fluted drill bit according to the present invention.
FIG. 7 is a top sectional view of the drill bit shown in FIG. 5 taken along the lines 7—7 indicated in FIG. 5.
Figure 6:
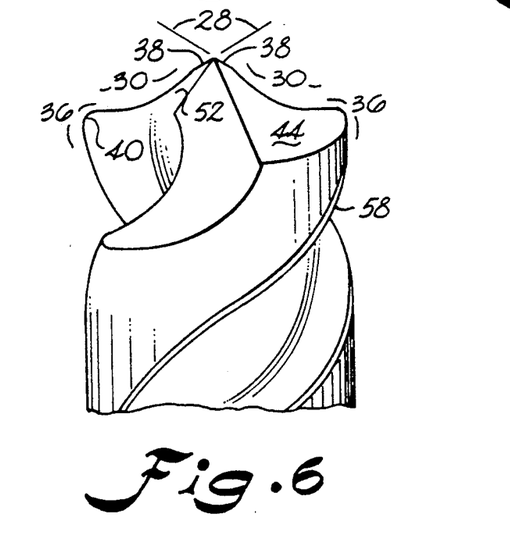
FIG. 6 is a side perspective view of the drill bit shown in FIG. 5 taken along the lines 6—6 indicated in FIG. 5.
Figures 8, 9, 10, 11:
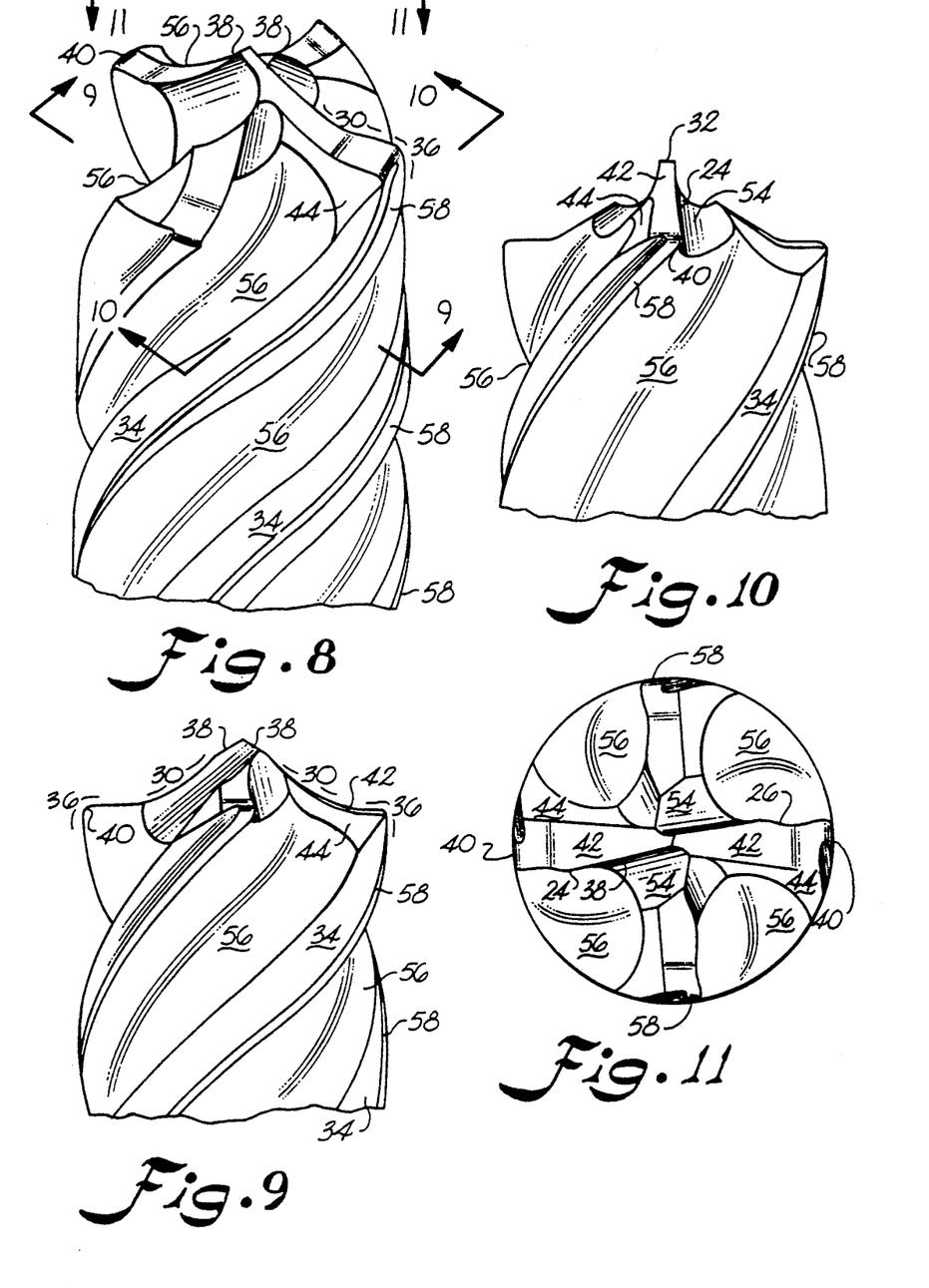
FIG. 8 is a perspective view of a four-fluted drill bit according to the present invention.
FIG. 9 is a side perspective view of the drill bit shown in FIG. 8 taken along the lines 9—9 indicated in FIG. 8.
FIG. 10 is another side view of the drill bit shown in FIG. 8 taken along the lines 10—10 indicated in FIG. 8.
FIG. 11 is a top sectional view of the drill bit shown in FIG. 8 taken along the lines 11—11 indicated in FIG. 8.

In accordance with the present invention, a preferred embodiment of a drill point according to the invention is depicted generally as 22 in FIGS. 5 through 7. Point 22 comprises at least two opposed cutting edges 24 and 26. Cutting edges 24 and 26 form a predetermined point angle 28, as shown in FIG. 6. The present invention is not limited to any particular point angle. As best seen in FIG. 5, in the two-fluted embodiment illustrated, cutting edges 24 and 26 are defined from their respective lands 34. A primary relief 42 is ground or otherwise formed onto cutting edges 24 and 26. In the embodiment shown a secondary relief 44 is provided. Corner 40 is formed at the point where land 34 forms with cutting edges 26 or 24.

Cutting edges 24 and 26 have first radial component 30 defined between tip 32 of the drill point and respective land 34 for that particular cutting edge. First radial component 30 is substantially concave with respect to a plane drawn perpendicular to the longitudinal axis of the drill point 22. Radial component 30 is best illustrated in FIG. 6. When considering the profile of the cutting edge in FIG. 6, it is readily seen that at least a portion of the profile includes radial component 30 having a predetermined concave aspect between tip 32 and corner 40. In a preferred embodiment, a flat component 38 is provided to the cutting edges at the tip of the drill point, flat components 38 defining point angle 28. As best seen in FIG. 5, primary relief 42 defines radial component 30, with secondary relief 44 having a relatively constant and flat face.

Drill point 22 comprises a second radial component 36 defined generally where cutting edges 24 and 26 merge with their respective lands 34. Second radial component 36 is substantially convex with respect to a plane drawn perpendicular to the longitudinal axis of drill point 22. Preferably, as seen in FIGS. 5 and 6, second radial component 36 is formed or ground into corner 40 between cutting edges 24 and 26 and their respective lands 34.

Figure 12:
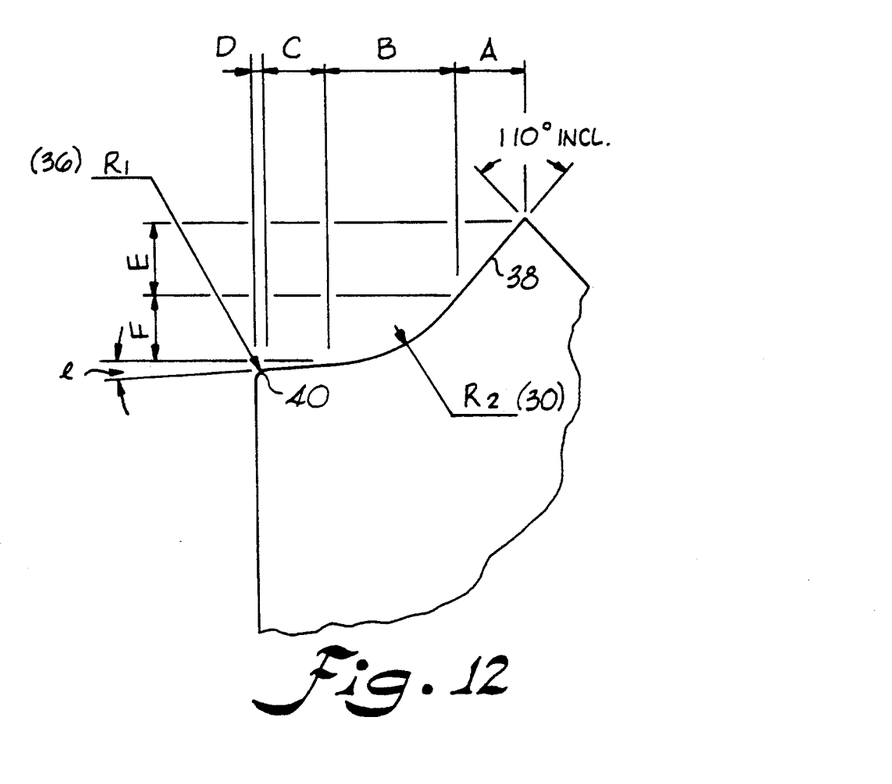
FIG. 12 is a partial diagrammatic depiction of a drill point and cutting edge according to the present invention particularly illustrating individual components thereof.
Figure 12A:
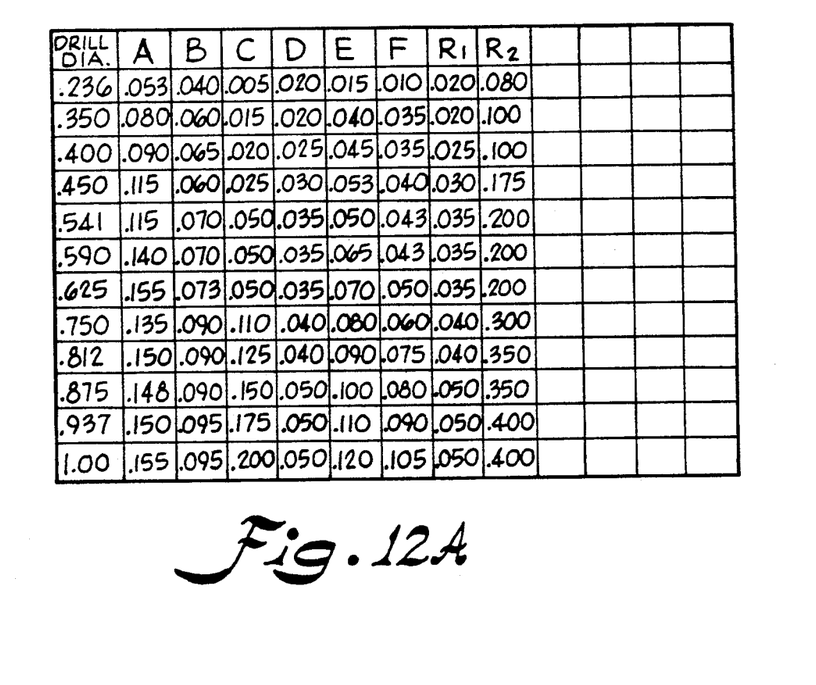
FIG. 12a is a table depicting nominal values for the components indicated in FIG. 12 for examples of preferred embodiments of the drill points according to the present invention.

The unique cutting edge profile having oppositely disposed radial components significantly increases the life of the drill point by tangentially directing stresses, and thus heat, away from the cutting edge of the drill point. FIG. 12 diagrammatically illustrates the components of the drill point with radial component 30 being R2 and second radial component 36 being R1. Flat component 38 has dimensions of A and radial component 30 is defined by component B. An additional relatively flat component C may be provided between corner 40 and flat component 38. However, in an alternative embodiment, radial component 30 may merge directly into corner 40. The table provided in FIG. 12a gives dimensions for the components of the cutting edge according to the invention for various size drill diameters. The values given are in decimals of inches. The values indicated are but preferred values for the drill diameters illustrated and do not limit those particular drill diameters to any particular dimensions. As can be seen, radius R1 and R2 increase with the size of the drill diameter. It should be also understood that dimensions A of flat component 38 may vary considerably, as well as those of component C, depending on the desired characteristics of the drill point. Also, the drill point shown in FIG. 12 has a point angle of 110°. As will be understood by those skilled in the art, a larger point angle, for example 135° will reduce the height (dimensions E and F) of the drill point and thus effect radial component R2. Thus, the dimensions given in FIG. 12a are but preferred dimensions for the drill diameter stated with a point angle of 110°. The dimensional values for the components will vary for the same size drill diameters according to the drill point angle desired. It should also be understood that radial component 30 is not limited to any particular value or range for any particular drill diameter. For example, for a drill diameter of 0.541 and point angle of 110°, it is not required that radial component 30 have a radius R2 of 0.200. Radius R2 may be greater or less than 0.200. The same discussion applies for radius R1 of radial component 36.

Drill point 22 may also comprise a chip breaking chisel edge 50, as shown in FIG. 7. Chisel edge 50 may be formed by grinding out a portion 52 of web 54 for each cutting edge 24 and 26. Also, drill point 22 may include a coolant channel hole 42 as known in the art and shown in the drill bit of FIGS. 1 and 2. The drill point depicted in FIGS. 8 through 11 is another preferred embodiment of the present invention. Radial components 30 and 36 are defined on cutting edges 24 and 26 of a four-fluted drill bit. The radial components are defined in primary relief 42 followed by a relatively flat and straight secondary relief 44. FIGS. 8 through 11 particularly illustrate land margins 58, which provide clearance for the trailing lands 34. Second radial component 36 is generally formed at corner 40 where land margins 58 merge with their respective cutting edges. This type of drill bit may additionally be utilized as a reamer with preferably a pair of land margins 58 being defined on each land 34.

Figure 13:
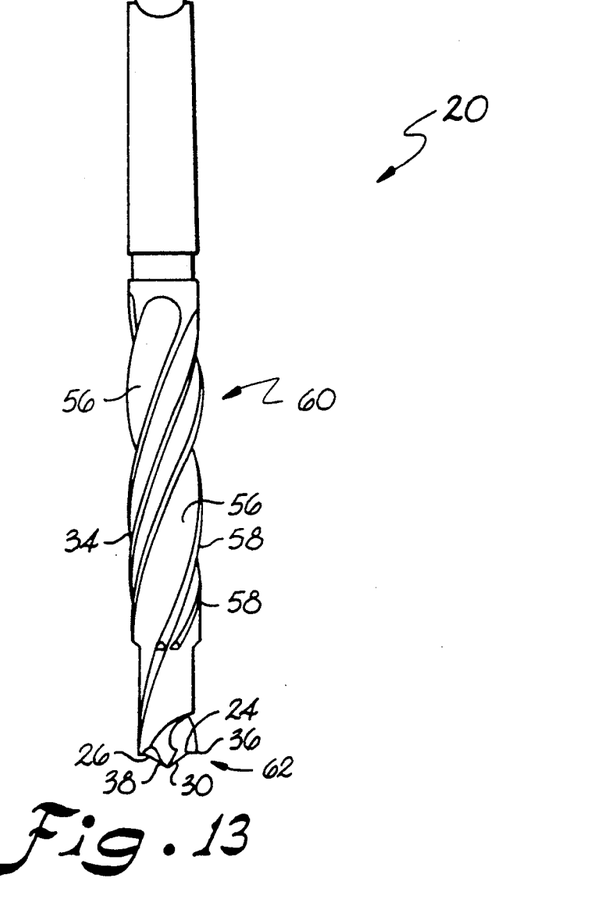
FIG. 13 is a perspective view of a drill bit according to the present invention particularly incorporating the drill point of the invention.

In further accordance with the present invention, a drill bit 20 is provided for drilling a variety of materials. As illustrated in the figures in general, particularly FIG. 13, a plurality of lands 34 are provided defining flutes 56. At least two opposed cutting edges 24 and 26 are provided with drill bit 20, the cutting edges having a substantially flat component 38 forming a predetermined drill point angle, as discussed above. Cutting edges 24 and 26 have a first substantially concave radial component 30 between flat component 38 and their respective land 34 and a corner 40 formed where the cutting edge merges with its respective land, corner 40 having a substantially convex radial component. Drill bit 20 may comprise a two-fluted drill bit, as illustrated in FIGS. 5 through 6, or a four-fluted drill bit, as illustrated in FIGS. 8 through 11. Drill bit 20 may comprise a step drill bit, as shown in FIG. 13. Further, drill bit 20 may comprise a reamer drill bit, wherein preferably at least two of lands 34 have a pair of reamer land margins 58 defined therein for precision reaming.

In further accordance with the present invention, a cutting tool is provided for cutting into a variety of materials. As illustrated in FIG. 13, the cutting tool comprises a body section, generally 60. At least two opposed cutting edges 24 and 26 extend from the extreme end of body section 60. The cutting edges form a cutting point 62 having a predetermined point angle. The cutting edges further comprise oppositely disposed adjacent radial components 30 and 36. Radial components 30 and 36 have already been discussed.

It should be understood by those skilled in the art that the drill point of the present invention may be embodied in a removable point which can be removed from the drill body and replaced by a sharpened point. Alternatively, the drill point can be ground or otherwise formed onto the body of a pre-existing drill. Furthermore, the configuration of the cutting edges of the invention can also be applied to drill bits having hardened inserts in order to prolong the life of such inserts. It should be further understood that the invention may be applied to a variety of drill point styles such as the chip breaker point used to break up and prevent the build up of chips around the tool thereby improving chip flow out of the drilled hole and offering an improved finish. The invention can also be applied to the Racon point style, the split point style, the dove point style, the helical point style, the notch point style, or any other conventional style of drill bit.

It should also be further understood that a variety of surface treatments can be applied to the drill point of the invention as well as to the body of the drill. Surface treatments such as steam, nitrate, titanium, and flash chrome can be used where desired.

In further accordance with the present invention, a method for forming the novel drill bit discussed above is provided. The method comprises the steps of forming a blank into a drill bit having a predetermined number of flutes, for example two or four flutes. Cutting edges are then formed onto the drill bit. A first concave radial component is formed into the cutting edge profile, the concave radial component being defined between the drill point and the drill lands. A second convex radial component is formed into the corner of the cutting edge where it merges with its respective land. The method preferably comprises the additional step of forming a chip breaking chisel edge into the drill point by grinding out a portion of the drill point web. The method may further comprise the step of forming the drill bit into a reamer drill bit by grinding or forming an additional lip margin into the drill bit lands. Also, the method may comprise the step of grinding a portion of the drill bit into a reduced diameter drill bit thereby forming a step drill bit.

Preferably, the step of forming the first radial component comprises grinding the radial component with substantially simultaneous axial and radial grinding strokes of a grinding wheel. The grinding strokes are substantially simultaneous so that the radial component is not segmented into a series of straight flat components but, has a relatively constantly varying slope. It is desirable to minimize as much as possible the formation of angles along the cutting edges of the drill bit. This can be accomplished by grinding the unique profile into the cutting edge with simultaneous axial and radial strokes of the grinding wheel. In a preferred embodiment, the cutting edge may be formed with a cam grinding device.

In further accordance with the purpose of the invention, a method is provided for forming an enhanced-wear drill point onto an existing drill bit. This method comprises the step of forming a first concave radial component into the existing cutting edge of the drill point between the tip of the drill point and the drill point land. A second concave radial component is formed into the existing corner of the drill point edges. Preferably, at least the first concave radial component is formed by grinding the component with substantially simultaneous axial and radial grinding strokes.

It will be understood that a variety of modifications can be made in the point and method of the present invention without departing from the scope of the invention as set forth in the appended claims. For example, radial components on one cutting edge of a drill bit may have different dimensions than those radial components on the opposite cutting edge.

What is claimed is:

1. A drill point for use on any variety of drill bits, said drill point comprising:
   at least two substantially opposed cutting edges, said cutting edges forming a predetermined drill point angle;
   each said cutting edge having a first substantially flat component at the tip thereof;
   a second radial component merging from said first flat component, said second radial component being substantially concave with respect to a plane drawn perpendicular to the longitudinal axis of said drill point; and
   a third radial component defined generally where said cutting edge merges with its respective land, said third radial component being substantially convex with respect to a plane drawn perpendicular to the longitudinal axis of said drill point.

2. The drill point as in claim 1, wherein said drill point angle is substantially 118°.

3. The drill point as in claim 1, wherein said third radial component merges directly from said second radial component.

4. The drill point as in claim 1, wherein said first, second, and third components are defined in the primary relief of said cutting edges.

5. The drill point as in claim 4, wherein said primary relief merges into a secondary relief, said secondary relief being substantially flat.

6. The drill point as in claim 1, wherein said drill point comprises an insert for an insert drill bit.

7. The drill point as in claim 1, further comprising at least one relief surface with at least one coolant channel hole disposed in said relief surface.

8. The drill point as in claim 1, further comprising a chip breaking chisel edge at said extreme tip of said drill point, said chisel edge defined by a ground out portion of the webs of each of said cutting edges.

9. A drill bit for drilling a variety of materials, said drill bit comprising:
a plurality of lands, said lands defining flutes;
at least two cutting edges defined by at least two of said lands, said cutting edges having a substantially flat component at the tip thereof forming a predetermined drill point angle;
each said cutting edge having a first substantially concave radial component merging from said flat component; and
a corner where said cutting edge merges with its respective said land, said corner having a substantially convex radial component merging from said concave radial component.

10. The drill bit as in claim 9, wherein said drill bit is a two fluted drill bit.

11. The drill bit as in claim 9, wherein said drill bit is a four fluted drill bit.

12. The drill bit as in claim 9, wherein said drill bit is a step drill bit.

13. The drill bit as in claim 9, wherein said drill bit is a reamer drill bit.

14. The drill bit as in claim 13, wherein at least two of said lands have a pair of reamer land margins for precision reaming.

15. A method for forming a drill bit having an extended wear drill point, said method comprising the steps of:
forming a blank into a drill bit having at least two flutes;
forming a cutting edge onto the drill bit;
forming a flat component at the tip of each cutting edge;
forming a first concave radial component into the cutting edge profile, the first concave radial component merging from the flat component at the cutting edge tip; and
forming a second convex radial component into the corner of the cutting edge and its respective land.

16. The method as in claim 15, further comprising the step of forming a chip breaking chisel edge into the drill point by grinding out a portion of the drill point web.

17. The method as in claim 15, further comprising the step of forming the drill bit into a reamer drill bit, including grinding an additional lip margin into the drill bit lands.

18. The method as in claim 15, further comprising grinding a portion of the drill bit into a reduced diameter forming a step drill bit.

19. The method as in claim 15, wherein said forming the first radial component comprises grinding the radial component with substantially simultaneous axial and radial grinding strokes of a grinding wheel.

20. The method as in claim 15, wherein said forming the first radial component comprises forming the radial component with a cam grinder.

* * * * *